United States Patent [19]
Russell et al.

[11] 3,811,916
[45] May 21, 1974

[54] METHOD FOR CARBON IMPREGNATION OF ALUMINA

[75] Inventors: Allen S. Russell, New Kensington; Noel Jarrett, Lower Burrell; Marshall J. Bruno, Greensburg; John A. Remper, Lower Burrell, all of Pa.

[73] Assignee: Aluminum Company of America, Pittsburgh, Pa.

[22] Filed: Sept. 7, 1971

[21] Appl. No.: 178,079

[52] U.S. Cl. .................. 117/46 CB, 23/95, 23/142, 117/46 CG, 117/100 B, 117/DIG. 6, 423/136, 423/137, 423/414, 423/439, 423/440, 423/496
[51] Int. Cl. ............................................. B44d 1/02
[58] Field of Search ........... 423/439, 496, 440, 136, 423/137, 414; 117/46 CB, 46 CG, 100 M, 100 B, DIG. 6; 23/142; 29/95

[56] References Cited
UNITED STATES PATENTS

| | | |
|---|---|---|
| 3,082,752 | 3/1963 | Thomas .......................... 117/46 CG |
| 2,975,000 | 3/1961 | Davis ............................. 117/DIG. 6 |
| 1,218,588 | 3/1917 | Barnett et al. ...................... 423/496 |
| 2,446,221 | 8/1948 | Ferguson .......................... 429/496 |
| 3,164,487 | 1/1965 | Carley-Macauly et al. ..... 117/46 CG |
| 3,682,759 | 8/1972 | Beutler et al. ................... 117/46 CG |
| 3,301,763 | 1/1967 | Beatty et al. .................... 117/46 CG |
| 2,389,636 | 11/1945 | Ramseyer ....................... 117/46 CG |
| 3,122,595 | 2/1964 | Oxley ............................ 117/46 CG |

Primary Examiner—William D. Martin
Assistant Examiner—William R. Trenor

[57] ABSTRACT

Process for the preparation of selectively constituted carbon impregnated alumina through the thermal cracking of hydrocarbon in contact with a fluidized bed of particles of precoated high surface area alumina in a first zone to deposit carbon in situ thereon in conjunction with the deposition of residual crackable hydrocarbon from the first zone gaseous effluent on particles of uncoated high surface area alumina in a second zone and prior to their introduction into said first zone, and minimization of the amounts of free hydrogen attendant the resultant carbon impregnated product.

33 Claims, 1 Drawing Figure

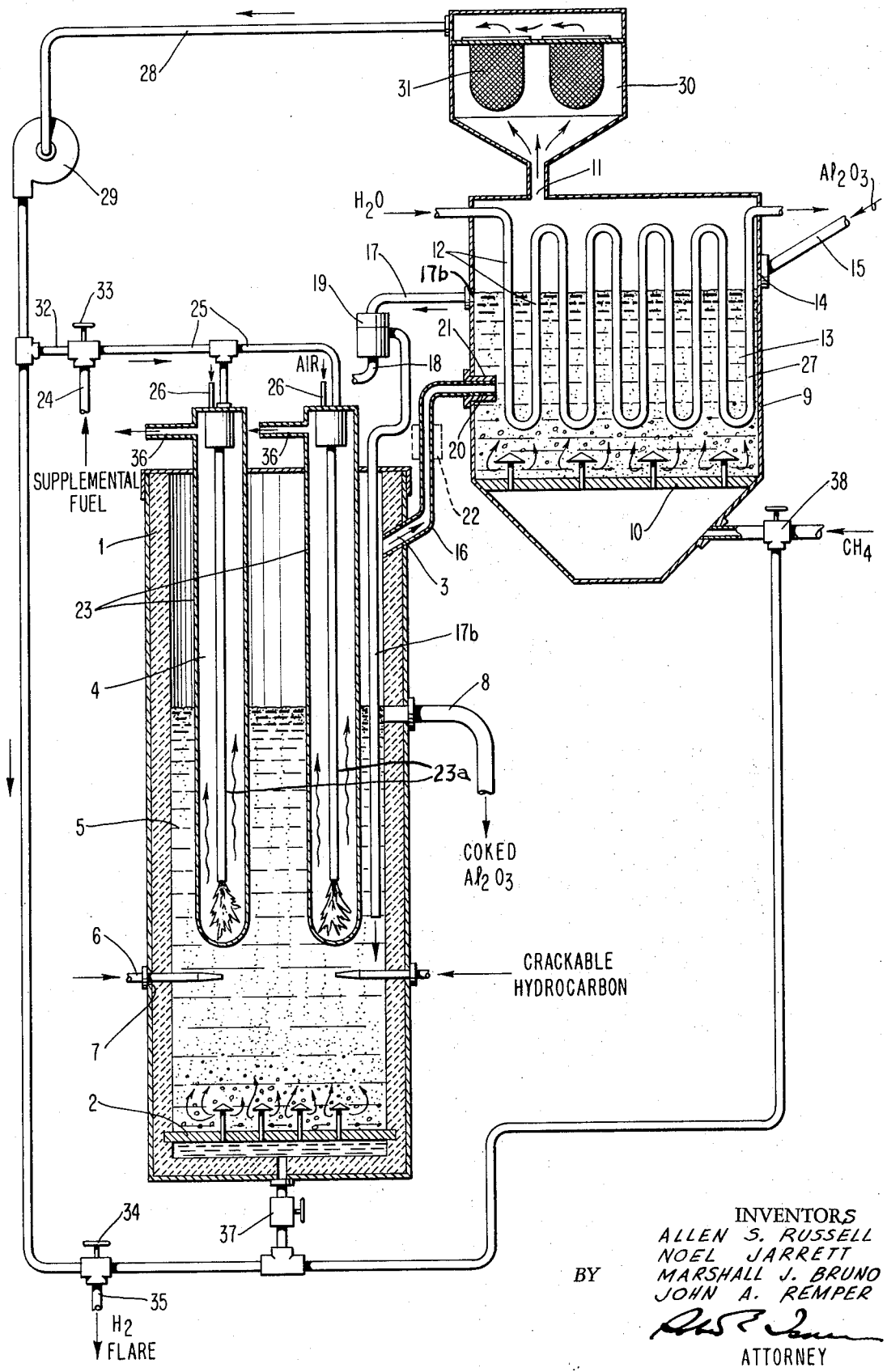

METHOD FOR CARBON IMPREGNATION OF ALUMINA

This invention relates to an improved method and apparatus for the preparation of selectively constituted carbon impregnated alumina particularly adapted for utilization in the production of high purity aluminum chloride, and more particularly relates to the preparation of such selectively constituted carbon impregnated alumina by the deposition of carbon in situ on pretreated particles of alumina by the thermal cracking of crackable hydrocarbon.

Although the potential advantages of utilizing aluminum chloride as a source material in the electrolytic production of aluminum have long been recognized, commercial realization thereof has been precluded by the inability of the art both to provide aluminum chloride of sufficiently high purity as to be utilizable therein and to provide aluminum chloride in any significant required quantity therefor in an economically acceptable manner. The long standing incentive and need for economically producible high purity aluminum chloride has resulted in extensive experimental exploration and evaluation of numerous suggested expedients for obtaining such long desired result. However, to date none of these suggested expedients has succeeded in satisfying the desired objective of commercial quantity production of economically producible high purity aluminum chloride.

Recent developments have indicated the feasibility of effecting the economic commercial production of high purity aluminum chloride suitable for use as a source material for the electrolytic production of aluminum. Such developments broadly include the chlorination of selectively constituted carbon impregnated alumina as one of the key operative steps thereof and this invention is particularly directed to an efficient and economic method for the commercial production of such carbon impregnated alumina.

This invention may be briefly described as an improved method and apparatus for the preparation of selectively constituted carbon impregnated alumina, which includes, in its broad aspects, thermally cracking hydrocarbon in contact with particles of pretreated alumina in a first zone to effect a uniform distribution of carbon deposited in situ thereon and depositing residual crackable hydrocarbon from the gaseous effluent of said first zone on alumina particles in a second zone for precoating thereof prior to their introduction into said first zone.

One object of the present invention is the provision of an improved closed circuit process for the efficient, low cost production of selectively constituted carbon impregnated particles of high surface area alumina through thermal cracking of crackable hydrocarbon on particles of high surface area alumina at comparatively low cracking temperatures while minimizing loss of energy values and conserving carbonaceous constituents by pretreating the alumina particles with the gaseous effluent from the cracking step to deposit residual crackable hydrocarbon from such effluent on the particles before they are subjected to the cracking step.

Another object of the invention is the provision of a process for economically effecting the carbon impregnation of substantially pure high surface area alumina particles, having a low alpha alumina content and a low loss on ignition, to form a highly reactive coked product, essentially free from hydrogen, preferably having a carbon content of about 15–24 percent by weight and of such character as to be especially suited for subsequent chlorination for the commercial production of high purity aluminum chloride.

It is a further object of the invention to provide a novel method and apparatus for the efficient and economic production of carbon impregnated alumina particles for producing selectively constituted carbon impregnated high surface area alumina particles having a final average hydrogen content of less than about 0.5 percent by weight based on the total alumina, carbon and hydrogen contents present.

It is a still further object of the invention to provide an improved closed circuit process and apparatus for the treatment of relatively pure high surface area alumina with liquid crackable hydrocarbon in a cracking zone to deposit carbon in situ thereon and the pretreatment of such alumina by deposition thereon of residual condensable crackable hydrocarbon contained in the gaseous effluent from the cracking zone.

Still another object of this invention is the economic provision of selectively constituted carbon impregnated particles of alumina particularly adapted for the production of high purity aluminum chloride.

Other and further objects of the present invention will become apparent from the following portions of this specification and from the accompanying drawing which, in accord with the mandates of the patent statutes, schematically illustrates combinational apparatus adapted to carry out the low cost carbon impregnation of high surface area alumina in accordance with the principles of this invention.

In its broad aspects, the improved process comprises thermally cracking crackable hydrocarbon in contact with particles of selectively constituted high surface area alumina in a first zone, at a cracking temperature sufficient to selectively crack such hydrocarbon without effecting quantitatively significant transformation of the alumina to alpha alumina, to deposit carbon produced by the cracking in situ on the particles of alumina and thereby form carbon impregnated or coked carbon coated particles of high surface area alumina and to produce a gaseous effluent containing hydrogen and residual thermally crackable hydrocarbon; recovering carbon impregnated particles of alumina from the first zone; depositing residual crackable hydrocarbon from the gaseous effluent from said first zone on particles of high surface area alumina in a second zone, at a cooling temperature sufficient to condense volatile carbonaceous constituent portions of such residual crackable hydrocarbon from such gaseous effluent for such deposition; and conducting such precoated particles of high surface area alumina having residual crackable hydrocarbon deposited thereon from the second zone to the first zone for thermal cracking of crackable hydrocarbon in contact therewith. The expression "thermally cracking" as used herein refers to any reaction whereby carbon is deposited on the alumina from a crackable hydrocarbon at elevated temperatures.

Advantageously, the described cracking operation effects carbon impregnation with minimum decrease in the high surface area of the starting alumina, and the resulting carbon impregnated particles of porous alumina can be obtained with a final hydrogen content of at most less than about 0.5 percent by weight based on the total alumina, carbon and hydrogen contents thereof, despite a high hydrogen concentration inherently present in the closed reaction system.

In more particularity, at the cracking temperatures employed, the hydrogen produced by the cracking is continuously removed from the first zone, i.e. from the cracking site, sufficiently that the carbon impregnated particles of high surface area alumina have an average hydrogen content of less than about said 0.5 percent by weight. On the other hand, if by chance the formed carbon impregnated alumina particles have an unduly high hydrogen content, such particles can thereafter be readily purged with gas, e.g. dry gas such as nitrogen or the like, to drive off sufficient hydrogen therefrom to provide the requisite low final average hydrogen content of less than about said 0.5 percent by weight. A low final average hydrogen content, i.e. in chemisorbed hydrocarbon form or other free or combined form, is particularly desirable since such minimizes chlorine consumption as well as unwanted by-products or contaminants such as hydrogen chloride in the subsequent chlorination to produce aluminum chloride. Furthermore, the carbon is deposited on the particles of alumina in the first zone to an extent sufficient to form highly reactive carbon impregnated particles of high surface area alumina having an average carbon content of about 15–24 percent, and preferably 17–19 percent, by weight, so as to permit such subsequent chlorination to be carried out under efficient exothermic reaction conditions.

According to a preferred embodiment, the cracking of a thermally crackable liquid hydrocarbon and associated deposition in situ of carbon produced thereby is carried out in the first zone in contact with a heated fluidized bed of pretreated particles of selectively constituted alumina maintained at an elevated temperature, i.e. at the loci of cracking, sufficient to crack the hydrocarbon, and suitably between 750 and 1,100°C, while the deposition of residual crackable hydrocarbon and other carbonaceous values is carried out in the second zone in a cooled fluidized bed of particles of such alumina maintained at a lower temperature, suitably between 20 and 100°C. Preferably the cooled bed is replenished by addition of fresh particles of high surface area alumina in an amount corresponding to the amount of precoated particles of alumina having residual crackable hydrocarbon deposited thereon being removed from the second zone and transferred to the first zone heated fluidized bed to replace the carbon impregnated particles of alumina that are being removed or recovered therefrom. Such introduction into the first zone is effected at a location where the bed is hot enough to heat such material rapidly to cracking temperature, so that the hydrocarbons do not volatilize away before they are cracked. In addition, at least a portion of the remaining gaseous effluent, from which residual crackable hydrocarbon has been deposited on particles of alumina in the second zone, can be removed from the second zone and either be fed to the first zone and/or back to the second zone to conserve carbonaceous values still present in the gaseous effluent.

While the cracking and coking operation is normally carried out at atmospheric pressure, if desired, slightly negative or vacuum pressures, e.g. down to 0.1 atmospheres absolute, as well as positive or elevated pressures, e.g. up to about 10 atmospheres absolute, can be used to enhance the cracking and in situ coking of the crackable hydrocarbon on the alumina particles. Generally, pressures of between about 0.1–10 atmospheres absolute can therefore be used for the cracking operation. Higher pressures within such range are preferred, however, since the output of the equipment is increased. The preferred range is about 1–3 atmospheres absolute. The precoating operation is generally carried out at substantially the same pressures as noted above for the cracking and coking operation.

The described thermal cracking of hydrocarbon in the first zone fluidized bed produces a hot gaseous effluent containing hydrogen and carbonaceous values which include volatile crackable hydrocarbons, e.g. thermally reducible carbon-containing condensable volatiles, and entrained carbonaceous particles. This hot gaseous effluent which is remvoed from the heated bed is introduced into the cooled fluidized bed of particles of high surface area alumina to reduce its temperature and deposit at least a portion of such carbonaceous values, e.g. including carbon dust and condensed thermally reducible hydrocarbons, on particles of alumina by contact therewith and thereby precoat such alumina particles preparatory to their introduction into the first zone. The hot gaseous effluent from the heated bed can also be cooled to a lower condensing temperature prior to its contact with the cooled bed and thereby additionally function to cool, at least in part, the cooled bed by contact therewith, or the cooled bed can be independently maintained at the lower condensing temperature sufficiently to quench or cool the hot gaseous effluent to reduce its temperature to a degree to effect the requisite condensation of volatile or condensable hydrocarbon values therein.

As noted above, at least a portion of the remaining cool gaseous effluent from the cooled bed, which still will contain some carbonaceous values therein can be recycled and fed to the heated bed as at least a portion of the fluidizing gas therefor whereby to assist in the fluidization thereof. More particularly, if the cooled bed is fluidized by hydrocarbon-containing gas, e.g. methane, ethane and/or propane or the like, at least a portion of the resultant mixed gaseous effluent from the cooled bed, which will include the remaining cooled gaseous effluent from the first zone which still contains carbonaceous values therein and the hydrocarbon-containing fluidizing gas from the second zone, can be fed to the heated bed and/or returned to the cooled bed as at least a portion of the fluidizing gases therefor whereby to contribute to the fluidization thereof.

As pointed out above, the character of the alumina introduced into the second zone is of significant importance. Such selectively constituted starting material desirably comprises substantially pure alumina, i.e. aluminum oxide, having an average alpha alumina content of less than about 5 percent, desirably of less than 3 percent and preferably of less than 1 percent by weight, an average loss on ignition (L.O.I.) of desirably less than about 5 percent, an average particle size of about 50–200 mesh (U.S. Sieve Series), and a surface area of at least about 10 m$^2$/g, desirably at least about 20 m$^2$/g and preferably at least about 80 m$^2$/g. (Surface areas referred to herein are based on the Brunauer, Emmett and Teller method described in Journal of American Chemical Soc., Vol. 60, pp. 309–319.) Material produced by the Bayer process generally possesses the requisite qualities, although substantially pure alumina from any other source can also be employed. Such substantially pure alumina should be substantially free of, i.e. have a total of less than about 0.5 percent by weight of, iron, silicon and titanium impurities, i.e. oxides or other compounds thereof, but yet may have a sodium impurities content of at most about 1.0 percent and more especially of at most about 0.6 percent by weight calculated as soda or $Na_2O$, e.g. sodium carbonate, sodium aluminate, sodium silicate and the like. It is even more suitable if the sodium impurities content is at most about 0.3 percent and preferably at most about 0.1 percent by weight calculated as $Na_2O$. Such substantially pure alumina is preferably made from alumina hydrate, calcined to convert the same into porous or high surface area alumina, i.e. prior to carbon impregnation. Such calcining can be carried out in a rotary kiln, oven, tower, tunnel, or the like, at a temperature of about 700–1,100°C, preferably about 800–900°C, and most preferably about 850°C, whereby alumina is formed having an average alpha alumina content of less than about 5 percent by weight and less than about 5 percent by weight total firmly bound water content, as aforesaid. Alpha alumina content referred to herein is determined by X-ray diffraction examination of the particles, and ascertaining the ratio of peak intensity for the 116 plane to the intensity of the peak for that same plane obtained from a standard alpha alumina specimen.

Such firmly bound water is not what is generally considered as absorbed or adsorbed water but is more firmly bound since it is still present after such calcining. Such firmly bound water may be defined functionally as that water representing an average weight loss on ignition (L.O.I.) of less than 5 percent by weight of the alumina. Specifically, L.O.I. as intended herein is ascertained by the standardized heating of the alumina to 300°C to drive off surface adsorbed water followed by the further heating of such alumina to 1,100°C, with weighing of the alumina after the 300°C heating and again after the 1,100°C heating, 100 times the difference in weight, divided by the weight after the 300°C heating, being the loss on ignition (L.O.I.).

In connection with the loss on ignition determination of alumina particles which have a volatile impurities content, e.g. sodium impurities, and which are impregnated with carbon, allowance must be made for the fact that such carbon and volatile impurities volatilize during the heating. Therefore, to make this determination on coked alumina, the carbon content and soda ($Na_2O$) content of the sample are measured on separate duplicate samples before and after the 1,100°C heating step. The change in weight from loss of carbon and sodium impurities present is computed and subtracted from the total change in weight.

The precalcining conditions are of significance to the extent that they should be such as to selectively convert the alumina particles to substantially water-free or anhydrous porous form, i.e. having at most about said 5 percent by weight total bound or L.O.I. water content without deleterious deterioration of its porosity. In this regard temperatures higher than about 1,100°C will usually cause the formation of undesired dense or low surface area alpha alumina in amounts beyond the limits set forth above.

By way of more specific example and with reference to the drawing, selectively constituted (and precoated as hereinafter pointed out) high surface area alumina, of a character such as that described above is provided in the form of a fluidized bed 5 disposed within a reaction vessel or shaft furnace 1, having a fluidizing gas distribution inlet assembly 2 at the lower end thereof. Such furnace 1 includes a gaseous effluent outlet 3 at the upper end thereof, indirect heating means 4 disposed therewithin for heating the contents thereof, crackable hydrocarbon feeding means such as liquid injection nozzles 6 for introducing normally liquid hydrocarbon thereinto in the vicinity of the heating means 4 for cracking in the bed 5 to form carbon and hydrogen and to deposit such carbon on the alumina bed particles, and a lateral outlet 8 disposed below the upper end of the reactor for withdrawing coked or carbon impregnated alumina bed particles at a selective bed level.

In combination therewith, a precoater chamber 9 containing a fluidized bed is provided. Such chamber 9 includes a fluidizing gas distribution inlet assembly 10 at the lower end thereof, a gaseous effluent outlet 11 at the upper end thereof, indirect heat exchange cooling means 12 for cooling the alumina particles of the fluidized bed 13 disposed therein, and a lateral chamber inlet 14 disposed above the gas distribution inlet 10 for introducing through feeder 15 alumina bed particles to be treated. Connected intermediate the gaseous effluent outlet 3 of the reactor vessel 1 and the inlet 20 of the chamber 9 is a gas conduit 16. As shown, the inlet 20 is located intermediate the gas distribution inlet 10 and the lateral alumina feed inlet 14, and the conduit 16 serves to transfer hot gaseous effluent from the reactor vessel 1 into the chamber 9. The inlet 20 is desirably insulated to minimize clogging thereof by condensate. A second conduit 17 is connected intermediate the particle outlet means 17a of the chamber 9 and the particle inlet means 17b of the reactor vessel 1, located at a level in the vicinity of the heat exchange heating means 4 therein, to transfer precoated particles from the chamber 9 to the vessel 1. The inlet means 17 are located so as to assure rapid heating of the hydrocarbons to avoid volatilization thereof before cracking. Such conduit 17 may include an intermediate fluidized seal chamber 19 supplied with auxiliary fluidizing gas via inlet 18 for effecting the desired flow of precoated alumina from chamber 9 to reactor vessel 1 without direct pressure communication therebetween.

The cooling means for cooling the gaseous effluent from the reactor vessel 1 may alternatively comprise or include an indirect heat exchange cooling means 22 operatively disposed outside of the chamber 9 in association with the gas flow conduit 16, e.g. intermediate the reactor vessel 1 and chamber 9, for cooling the gaseous effluent from the reactor vessel 1 prior to transfer thereof into the chamber 9.

The illustrated injection nozzles 6 are preferably positioned in radial spaced apart relation about the periphery 7 of reactor vessel 1 so that the injected hydrocarbon, when in liquid form, can be rapidly cracked at the desired cracking temperature. The projection of each of the nozzles 6 into the reactor vessel 1 acts to insure that such issuing hydrocarbon will be in liquid form and will be subject to preheating through exposure to the surrounding high cracking temperatures. Means (not shown) for preliminary preheating of the crackable hydrocarbon, e.g. liquid or solid hydrocarbon, prior to reaching the injection nozzles can be provided if desired so that the hydrocarbon will more readily flow in liquid form from the nozzles.

The indirect heat exchange means 4 for the reaction vessel 1 may be suitably constituted by spaced apart elongated tubular elements 23 extending downwardly into the reactor vessel 1 for immersion in the fluidized bed 5 sufficiently to heat the bed to the desired cracking temperature. A fuel line 24 is provided to feed combustible fuel, e.g. natural gas, fuel oil, coke breeze, or gas produced by the cracking process, etc., from a remote source via distribution line 25 to open flame burners 23a within elements 23 for combustion with supporting air entering through inlets 26. The combustion products exit through lines 36.

The indirect heat exchange cooling means 12 for the precoater chamber 9 may comprise water or other fluid coolant cooled coils 27 or the like extending within the chamber 9 for immersion in the fluidized bed 13.

In the practice of the invention, thermally crackable hydrocarbon, preferably in the form of normally liquid hydrocarbon, is injected in a sufficient quantity into the bed 5 through nozzles 6 to contact the precoated particles of alumina therein and be cracked to produce carbon and hydrogen, and provide coked alumina particles having the requisite carbon and hydrogen contents noted above. The carbon so produced is deposited directly in situ throughout the internal and external surfaces of the alumina. As noted above, the use of normally liquid hydrocarbon for the cracking reaction is preferred since the same results in a more reactive product. Although the reasons therefor are not fully understood, it is felt that such occurs because the injected liquid hydrocarbon has an opportunity to wet the alumina before being cracked. Preferably, the crackable hydrocarbon should be essentially free of contaminating moisture so as to minimize loss of cracked carbon through combustion with the oxygen value of such moisture.

In this regard, it should be noted that while normally gaseous hydrocarbon such as methane, ethane or propane might also be employed for the cracking, use of such gaseous hydrocarbons has been found to result in the formation of thicker coatings on the exterior surfaces of the particles which detrimentally operates to decrease the desired high surface area thereof. More specifically, it has been observed that use of normally gaseous hydrocarbon for the cracking can cause the original high surface areas in the order of at least 80 m$^2$/g of the porous alumina to decrease to e.g. 30-40 m$^2$/g, whereas the high surface area of carbon impregnated alumina resulting from the use of normally liquid hydrocarbon is much less reduced. In the operation of equipment such as is described herein some combination of the two types of deposition is to be expected.

As to suitable normally liquid hydrocarbons, fuel oil, such as No. 6 fuel oil and commercial Bunker C fuel oil, are economically preferred types thereof. Generally, the higher the aromatic or unsaturated hydrocarbon content thereof, the higher will be the fixed carbon content available for in situ deposition upon cracking, while a proportionately lower content of hydrogen produced by the cracking will be available for undesirable retention on the carbon impregnated alumina, including carbon which may be combined with hydrogen in hydrocarbon form or other combination form.

When in continuous operation, selectively constituted alumina of the character set forth above, is first fed at ambient temperature (about 15-30°C), into the precoating chamber 9 with the fluidized bed 13 thereof being maintained at a temperature of about 20-100°C and kept in a fluidized condition by upward passage of hydrocarbon-containing gas such as methane, ethane and/or propane therethrough. The hot gaseous effluent from the cracking reaction is also introduced into such bed through conduit 16. Such hot gaseous effluent will normally contain residual crackable hydrocarbon, including thermally reducible carbon-containing materials and other carbonaceous values such as condensable volatilized crackable hydrocarbons, for example partially cracked unsaturated hydrocarbon, and the like, which result from the cracking reaction, and hydrocarbon-containing gas such as methane, ethane and/or propane from the fluidizing gas for the reaction chamber 1, as well as hydrogen, entrained fine carbon particles or carbon dust and fine coked alumina particles, and the like. Upon contact of such hot gaseous effluent with the relatively cool alumina in the bed 13, the residual crackable hydrocarbon, including the valuable carbonaceous constituents such as described above will be quenched and a substantial portion thereof will condense and/or deposit on the high surface area alumina particles to precoat the same. The high adsorption and absorption properties of the alumina used favor such deposition. It is possible that the condensed hydrocarbon fractions which become adsorbed or absorbed on the alumina particles of the cooled bed provide a slightly sticky surface environment which serves to enhance the deposition on such particles of the attendant fine carbon and coked alumina dust.

Temperatures above about 100°C are generally not desirable in the precoater fluidized bed because insufficient quenching and condensation of the volatile hydrocarbon fractions and even revolatilization of the hydrocarbon constituents can then take place, while temperatures below about 20°C will generally require unnecessarily high cooling expense. A preferred cooling temperature is about 50°C, especially where the cracking temperature is about 900°C.

Also, when in continuous closed circuit operation, precoated alumina in amounts corresponding to the amounts of starting alumina being fed to the precoater chamber 9 may be recovered from and transferred to the heated bed 5 concurrently with the removal of similar quantities of carbon impregnated alumina therefrom, so that balanced amounts of alumina particles are maintained in the two units.

Where the cracking bed in the first zone and the precoater bed in the second are both fluidized beds, the carbonaceous values-containing cool gaseous effluent from the second fluidized bed, which comprises hydrocarbon-containing fluidizing gas and hydrogen can be conveniently recovered and fed to the first fluidized bed so as to constitute at least a portion of the gas used to fluidize the same. Alternatively, such cooled gaseous effluent from the precoater can, at least in part, be recycled directly to the cooled bed as the fluidizing gas therefor. In either case, such cool gaseous effluent from the precoater 9 is preferably first filtered so as to separate entrained solids therefrom and return such solids to the fluidized bed of the precoater to conserve both the carbon and alumina values therein.

Additionally, at least a portion of such cooled and filtered gaseous effluent from the precoater can be conveniently burned, as for instance within indirect heat exchange heating elements 4 to supply heat to the first zone bed and thereby utilize and hence conserve the combustible values therein. Such also particularly provides for efficient conservation and utilization of the hydrogen content in the gaseous effluent which is produced by the cracking as well as aiding in removing excess gas from the system.

To the above ends, an effluent gas recycle conduit 28 selectively interconnects the gaseous effluent outlet 11 of the precoater chamber 9 through a blower 29 and control valves 33, 37 and 38, with the fluidizing gas distribution inlet 2 of the reactor vessel 1, with the fluidizing gas distribution inlet 10 of the chamber 9 and with the heat exchangers 4 through conduit 32 and distributor line 25 in such manner as to maintain an essentially closed environment system.

A bag filter assembly 30, containing filters 31 for effecting separation and return of contaminant solids as noted above, is interposed between the outlet 11 and the conduit 28. Not only does this filter operate to conserve the carbon and alumina values of such solids, but it will also prevent fouling of the compresser or pump 29.

In addition to the foregoing, means such as valve 34 and line 35 are provided to continuously bleed off a portion of the gaseous effluent in recycle conduit 28 to remove accumulated hydrogen from the system. Hydrogen may thus be removed and flared irrespective of whether additional hydrogen is also removed via branch line 32 for burning in heating elements 23.

It has been found, in the specific case of cracking normally liquid hydrocarbon in a fluidized bed of alumina under the conditions described above, that only about 60 percent by weight of the normally liquid hydrocarbon injected into the cracking and coking heated fluidized bed will be cracked and deposited in situ on the precoated alumina particles with the remainder representing essentially volatilized cracked unsaturated hydrocarbon fractions. For example, for each pound of injected hydrocarbon, i.e. No. 6 fuel oil or Bunker C fuel oil, about 0.6 lb. of carbon will be cracked and deposited on the alumina in the heated fluidized bed. In the precoater cooled fluidized bed, about an additional 0.1 lb. of carbon will be recovered from the hot gaseous effluent fed thereto as a consequence of the described condensation or deposition on the cooled alumina therein. Significantly, by recirculation of off-gases, about a further 0.1 lb. of carbon/lb. of hydrocarbon can be recovered and deposited on the alumina.

As evidenced by the above, the presence of the fluidized bed precoater in conjunction with the fluidized main cracking and coking bed affords higher efficiency for the overall carbonizing process. About 10–15 percent by weight of the carbon values can be recovered by condensation and deposition on the alumina in the precoater bed and a further 5–10 percent by weight carbon values can be recovered by recycling the off gas from the precoater to the heated bed, as fluidizing gas therefor, so as to obtain a significantly higher overall carbon yield, which can amount to about 15–24 percent by weight total carbon, coated on the alumina.

When using fluidized beds in the first and second zones, the amount of volatile hydrocarbons condensed, deposited and/or absorbed on the alumina in the cooled precoater bed should be at most about 15 percent by weight. Efforts to reach higher amounts apparently cause the cooled bed particles to become too sticky whereupon the particles agglomerate and the fluidized bed is destroyed. The desired amount of hydrocarbon to be precoated on the alumina particles in the precoater can be controlled through adjustment of th first bed temperature and alumina-oil feed ratio.

In accordance with a preferred feature, the cracking temperature is maintained at about 750–950°C, the precoater cooling temperature is maintained at about 20–60°C, and the average carbon content of the caked or carbon impregnated alumina particles recovered is about 17–19 percent by weight.

EXAMPLE

The following example sets forth an illustrative example of operations in accord with the principles of this invention.

Substantially pure porous alumina particles of about −100 +200 mesh average particle size, produced from bauxite by the Bayer process, containing less than about 0.5 percent by weight total iron, silicon and titanium constituents and about 0.25 percent by weight sodium constituents, calculated as $Na_2O$, and precalcined at about 850°C to provide a final calcined product having less than about 3 percent by weight alpha content and less than about 5 percent by weight L.O.I., and a surface area of about 100 $m^2/g$, were fed at a rate of 50 pounds per hour via the feeder 15 into the precoater fluidized bed chamber 9 of a closed system apparatus generally similar to the figure of the drawing.

Chamber 9 contained alumina in the form of a fluidized bed maintained by the upward passage of effluent gas from chamber 1 through a conduit 16 to distribution inlet 10. The bed was maintained at about 20°C by cooling water conducted through the cooling means 12 in the form of downwardly extending plate coil cooling elements immersed in the bed. After equilibrium had been established, the methane gas feed was interrupted at valve 38 and recycle methane-containing gas from recycle conduit 28 was used to fluidize the cooled bed.

Alumina particles at about 70°C in the cooled fluidized bed, overflowed through conduit 17 and through fluid leg 19 downwardly into the heated fluidized bed maintained in the shaft furnace 1 by passing methane-containing fluidizing gas from recycle conduit 28 at about 70°C upwardly through distribution inlet 2 into the bed.

The overflow of alumina particles from chamber 9 through conduit 17 to shaft furnace 1 was at the same rate as the feed of fresh alumina particles via inlet 14 to chamber 9, and treated alumina particles were recovered from the bed in shaft furnace 1 through outlet 8 at about the same such flow rate, thereby maintaining an equilibrium balance in the system provided by the two fluidized beds.

The methane-containing effluent gas from chamber 9 left that chamber at about 70°C via outlet 11. Entrained alumina particles and dust were removed in the filter 30 and were returned to the cooled bed by gravity while the dust-free effluent passed via line 28 to a blower 29, and thence a portion thereof was fed to distribution inlet 2 as the gas for fluidizing the heated bed in shaft furnace 1.

Natural gas was fed to the burners of heating elements 23 immersed in the heated bed for burning with air supplied via lines 26 to produce a cracking temperature of about 910°C in the heated bed. The decomposition products of such burning left the elements 23 via the combustion outlets 36 so that neither air, oxygen or combustion products came into contact with the alumina particles in the heated bed.

No. 6 fuel oil, preheated to about 150°C at a point external to shaft furnace 1, was injected into the heated bed at a rate of about 15 pounds per hour through oil nozzles 6 situated radially about the periphery of shaft furnace 1, in the vicinity of the heating elements 23, the fuel oil heating up to about 350°C in the portions of the nozzles immersed in the heated bed before issuing from the nozzles into contact with the bed particles. The oil generally wet or contacted the alumina particles and was cracked at the 910°C temperature of the bed during an extremely short residence time, whereupon the carbon so produced was deposited in situ directly and immediately throughout the internal and external surfaces of the particles to provide coked carbon coated or carbon impregnated porous alumina particles. Such particles exited from the bed at a constant overflow rate of about 57.5 pounds per hour through outlet 8 as noted above.

The gaseous effluent from shaft furnace 1, carrying entrained alumina particles and carbon dust therein as well as residual crackable hydrocarbon including gaseous and condensable volatile hydrocarbon constituents, i.e., thermally reducible carbonaceous constituents, exited via outlet 3 for introduction into the cooled bed of chamber 9 described above.

The gaseous effluent from shaft furnace 1, flowed into the cooled bed in chamber 9 at about said 910°C temperature, and was immediately quenched in the cooled bed which was maintained at about 70°C. Such quenching caused the condensation and/or deposition on the alumina particles in the cooled bed of the gaseous and condensable volatile hydrocarbon constituents and the entrained carbon dust and partly coked alumina fines, so as to achieve the precoating of such alumina particles therewith prior to overflow thereof through conduit 17 for introduction into the heated bed in shaft furnace 1 as aforesaid.

A still further portion of the gas being recycled from the outlet 11 of chamber 9 through the bag house filter arrangement 30 and recycle conduit 28, was removed at valve 34 via line 35 and flared to burn the hydrogen content therein which was generated during the cracking which takes place in shaft furnace 1.

The total quantity of gas burned in the burners of heating elements 23 and removed via line 35 to burn off accumulated hydrogen corresponded to the gases formed during the coking operation, whereas the portions of recycle gas used to fluidize the bed in chamber 1 remained more or less constant after equilibrium had been established.

A pressure of 1-2 atmosphere absolute was maintained in shaft furnace 1 and in chamber 9.

The coked carbon coated alumina, recovered at about 910°C via outlet 8 from shaft furnace 1 retained the same alpha alumina content as the starting porous alumina fed via inlet 14 to chamber 9. The alpha alumina content of the recovered coked alumina was not increased because of the relatively low cracking temperature employed, and the surface area was not materially decreased.

The recovered coked or carbon impregnated alumina particles had an average carbon content of about 18 percent by weight, and a concomitant hydrogen content of about 0.12 percent by weight based on the total alumina, carbon and hydrogen content present, an average particle size which was still about 100 mesh, a total of less than about 0.5 percent by weight combined iron, silicon and titanium impurities, and about 0.25 percent by weight sodium constituents, i.e. soda, calculated as $Na_2O$.

The No. 6 fuel oil used contained 0.89 lb. of carbon/lb. of such fuel oil, and about 0.585 lb. carbon/lb. fuel oil (about 60 percent of the fuel oil and about 65 percent of the carbon content thereof) was deposited in situ on the alumina by the cracking in the shaft furnace and about another 0.1 lb. carbon/lb. fuel oil was deposited from the hot gaseous effluent by the precoating in the cooled bed chamber for a total of about 0.685 lb. coked carbon on the alumina/lb. of fuel oil used.

The foregoing cracking and coking reaction thus leads to the efficient and economic production of a substantially pure selectively constituted and uniformly distributed carbon impregnated alumina product which is eminently suitable as a reactant in the preparation of high purity aluminum chloride. Such carbon impregnated porous alumina product is characterized by an average surface area of at least about 10 $m^2/g$ and preferably greater than about 80 $m^2/g$; an average particle size of preferably about 50-200 mesh; an alpha alumina content of at most about 5 percent, especially at most about 3 percent and more especially at most about 1 percent by weight; a loss on ignition of at most about 5 percent, especially at most about 3 percent and more especially at most about 1 percent by weight; a carbon content of about 15-24 percent by weight, and preferably about 17-19 percent by weight; a hydrogen content of less than about 0.5 percent by weight and preferably less than about 0.1 percent by weight based on the total alumina, carbon and hydrogen contents present; and is substantially free from iron, silicon and titanium constituents or impurities, e.g. having a total Fe, Si, and Ti impurities content of less than about 0.5 percent by weight; and preferably also has a sodium impurities content of at most about 1.0 percent, especially at most about 0.6 percent, more especially at most about 0.3 percent and preferably at most about 0.1 percent by weight calculated as $Na_2O$.

Such coked or carbon impregnated alumina produced according to the invention is a highly reactive consumable material well-suited for the production of aluminum chloride since it is essentially free from troublesome contaminants including water, hydrogen, oxygen, and iron, silicon and titanium impurities, and since the carbon content is uniformly and thoroughly distributed in a sufficient layer throughout the internal and external surfaces of the alumina particles for a more uniform and complete chlorination reaction.

What is claimed is:

1. Process for the production of carbon impregnated alumina which comprises cracking crackable hydrocarbon in contact with alumina in a first zone to deposit carbon produced by the cracking on the alumina and to produce a gaseous effluent containing hydrogen and residual crackable hydrocarbon, recovering carbon impregnated alumina from the first zone, depositing residual crackable hydrocarbon from the gaseous effluent on alumina in a second zone, and conducting alumina having residual crackable hydrocarbon deposited thereon from the second zone to the first zone for thermal cracking of crackable hydrocarbon in contact therewith.

2. Process according to claim 1 wherein the recovered carbon impregnated alumina has an average carbon content of about 15–24 percent by weight.

3. Process according to claim 1 wherein the recovered carbon impregnated alumina has an average carbon content of about 17–19 percent by weight.

4. Process according to claim 1 including the step of continuously removing from the first zone hydrogen produced by the cracking in amounts sufficient to render the average hydrogen content of said carbon impregnated alumina at less than about 0.5 percent weight.

5. Process according to claim 1 including the step of maintaining the average alumina temperature at the loci of cracking in the first zone between about 750–1,100°C.

6. Process according to claim 1 including the step of maintaining the temperature of said second zone between about 20–100°C to effect deposition of said residual crackable hydrocarbon on said alumina therein.

7. Process according to claim 1 wherein the pressure in each of the first and second zones is between about 0.1–10 atmospheres absolute.

8. Process according to claim 1 including the step of removing hydrogen values from the gaseous effluent of said cracking step.

9. Process according to claim 1 including the step of feeding at least a portion of the gaseous effluent from the second zone to the first zone.

10. Process according to claim 1 including the step of cracking said hydrocarbon in a heated fluidized bed of alumina in said first zone, and the step of depositing said residual crackable hydrocarbon in a cooled fluidized bed of alumina in said second zone.

11. Process according to claim 10 including the step of feeding fresh particles of alumina to the second zone in an amount corresponding to the amount of particles of alumina having residual crackable hydrocarbon deposited thereon conducted from said second zone to the first zone.

12. Process according to claim 1 wherein the alumina introduced into said second zone has an average alpha alumina content of less than about 5 percent by weight.

13. Process according to claim 12 wherein said alumina has an average loss on ignition of less than about 5 percent by weight.

14. Process according to claim 1 wherein the alumina has a total iron, silicon and titanium impurities content of less than about 0.5 percent by weight, a sodium impurities content no greater than about 1.0 percent by weight calculated as $Na_2O$, and an average surface area of at least about 10 $m^2/g$.

15. Process according to claim 1 wherein the alumina introduced into said second zone has a total iron, silicon and titanium impurities content of less than about 0.5 percent by weight.

16. Process according to claim 1 wherein the alumina introduced into said second zone has a sodium impurities content no greater than about 1.0 percent by weight calculated as $Na_2O$.

17. Process according to claim 1 wherein the alumina introduced into said second zone has an average surface area of at least about 10 $m^2/g$.

18. Process according to claim 1 wherein the alumina introduced into said second zone has an average loss on ignition of less than about 5 percent by weight.

19. Process according to claim 1 wherein said alumina in said second zone has an average alpha alumina content of less than about 3 percent by weight.

20. Process according to claim 1 wherein said alumina in said second zone has an average surface area of at least 80 $m^2/g$.

21. Process according to claim 1 for the production of carbon impregnated particles of alumina in the form of coked alumina which comprises the steps of thermally cracking said crackable hydrocarbon in said first zone in contact with a bed of particles of alumina maintained at a temperature sufficient to crack said hydrocarbon, depositing carbon produced by said thermal cracking in situ on the particles of alumina and removing hot gaseous effluent resulting from said thermal cracking which contains carbonaceous values including volatile crackable hydrocarbon and entrained carbonaceous particles from said first zone, contacting said hot gaseous effluent with a lower temperature bed of particles of alumina in said second zone to deposit at least a portion of said carbonaceous values thereon for precoating the same, and introducing such precoated particles of alumina into the first zone bed.

22. Process according to claim 21 including the step of cooling said hot gaseous effluent from the first zone prior to its contact with the particles of alumina in said second zone.

23. Process according to claim 21 including the step of maintaining said bed in said second zone at a temperature sufficient to cool the hot gaseous effluent to a degree to effect condensation of condensable hydrocarbons therein.

24. Process according to claim 21 including the step of transferring at least a portion of the cool gaseous effluent from said second zone to the bed in said first zone to assist in the fluidization thereof.

25. Process according to claim 21 including the steps of fluidizing the bed in said second zone by introduction of hydrocarbon-containing gas therein, and introducing at least a portion of the resultant mixed gaseous effluent from the bed in said second zone into the bed in said first zone to contribute to the fluidizing thereof.

26. Process according to claim 21 for the production of carbon impregnated particles of alumina in the form of coked alumina which comprises the steps of transferring particles of alumina from a cooled fluidized bed of such alumina in said second zone maintained at a temperature of about 20–100°C into a heated bed of alumina in said first zone maintained at a temperature of about 750–1,100°C, fluidizing said heated bed by upward passage of gas therethrough, thermally cracking crackable hydrocarbon in contact with the particles of said heated bed to deposit carbon in situ on the alumina particles therein, introducing the hot gaseous effluent containing crackable hydrocarbons and entrained carbonaceous particles from said first zone into the cooled bed in said second zone to condense at least a portion of the volatile hydrocarbons therein and to deposit such condensed hydrocarbons and entrained carbonaceous particles on particles of alumina in the cooled bed prior to transfer thereof to said heated bed, and recovering coked alumina particles from the heated bed.

27. Process according to claim 25 including the step of introducing hydrocarbon-containing gas into the cooled bed in said second zone to fluidize the same and introducing at least a portion of the gaseous effluent from the cooled bed comprising the remaining cooled gaseous effluent from said first zone and which still contains carbonaceous values therein and the hydrocarbon-containing fluidizing gas into the heated bed in said first zone to contribute to the fluidization thereof.

28. Process according to claim 25 including the step of injecting crackable hydrocarbon in liquid form into the heated bed for liquid contact with the particles of alumina therein in a quantity sufficient to provide coked alumina particles having an average carbon content of about 15–24 percent by weight and an average hydrogen content of less than about 0.5 percent by weight.

29. Process according to claim 28 wherein the average carbon content of the coked alumina particles is about 17–19 percent by weight.

30. Process according to claim 25 including the steps of maintaining the temperature of the cooled bed about 20–60°C, and maintaining the temperature of the heated bed about 750–950°C.

31. Process according to claim 21 including the step of introducing said precoated particles of alumina into said first zone at a location permitting a rapid increase in the temperature thereof to the cracking temperature with minimal volatilization of said hydrocarbon.

32. Process according to claim 21 including the step of fluidizing the bed in said second zone by reintroducing at least a portion of the gaseous effluent therefrom thereinto.

33. Process according to claim 1 including the step of purging the carbon impregnated alumina with gas to reduce the hydrogen content thereof.

* * * * *